US008358565B2

(12) United States Patent
Komura et al.

(10) Patent No.: US 8,358,565 B2
(45) Date of Patent: Jan. 22, 2013

(54) THERMALLY-ASSISTED MAGNETIC RECORDING HEAD HAVING DUMMY WAVEGUIDES FOR LIGHT BEAM ALIGNMENT

(75) Inventors: Eiji Komura, Tokyo (JP); Tsutomu Chou, Tokyo (JP)

(73) Assignee: TDK Corporation, Tokyo (JP)

( * ) Notice: Subject to any disclaimer, the term of this patent is extended or adjusted under 35 U.S.C. 154(b) by 243 days.

(21) Appl. No.: 12/951,587

(22) Filed: Nov. 22, 2010

(65) Prior Publication Data

US 2012/0127838 A1    May 24, 2012

(51) Int. Cl.
*G11B 11/00* (2006.01)
(52) U.S. Cl. .................................. 369/13.33; 369/13.13
(58) Field of Classification Search ................ 369/13.13, 369/13.33, 13.32, 13.02, 112.09, 112.14, 369/112.21, 112.27, 300; 360/59; 385/129, 385/31, 88–94; 29/603.07–603.27; 250/201.3, 250/201.5
See application file for complete search history.

(56) References Cited

U.S. PATENT DOCUMENTS

| 6,768,556 | B1 | 7/2004 | Matsumoto et al. | |
| 8,248,898 | B2 * | 8/2012 | Schreck et al. | 369/13.33 |
| 2003/0066944 | A1 | 4/2003 | Matsumoto et al. | |
| 2004/0081031 | A1 | 4/2004 | Saga et al. | |
| 2008/0055784 | A1 | 3/2008 | Shimazawa et al. | |
| 2008/0204916 | A1 * | 8/2008 | Matsumoto et al. | 369/13.33 |
| 2009/0052077 | A1 | 2/2009 | Tanaka et al. | |
| 2010/0103553 | A1 | 4/2010 | Shimazawa et al. | |
| 2011/0038235 | A1 * | 2/2011 | Matsumoto et al. | 369/13.33 |
| 2012/0163137 | A1 * | 6/2012 | Wang et al. | 369/13.33 |

FOREIGN PATENT DOCUMENTS

JP   A-2000-339601   12/2000

* cited by examiner

*Primary Examiner* — Tan X Dinh
(74) *Attorney, Agent, or Firm* — Posz Law Group, PLC

(57) ABSTRACT

A thermally assisted magnetic recording head includes a magnetic recording element part for writing, a main waveguide for assistance for receiving light, and a dummy waveguide component part provided in parallel to the main waveguide. The dummy waveguide component part includes a pair of waveguides having the same shape and dimensions including a first waveguide and a second waveguide that receive light from a back end surface opposite to an air bearing surface and guides the light toward the air bearing surface, and light emitting ends of the first waveguide and the second waveguide facing towards the air bearing surface have no shielding material, and are in a free condition so that the light intensity from the light emitting ends can be measured.

8 Claims, 11 Drawing Sheets

THERMALLY-ASSISTED MAGNETIC RECORDING HEAD HAVING DUMMY WAVEGUIDES FOR LIGHT BEAM ALIGNMENT

BACKGROUND OF THE INVENTION

1. Field of the Invention

The present invention relates to a thermally assisted magnetic recording head with an optical waveguide for thermal assistance. In particular, the present invention relates to a thermally assisted magnetic recording head with a pair of dummy optical waveguides for alignment in order to align with a light source with high precision, and a primary optical waveguide for thermal assistance.

2. Description of the Background Technology

In the field of magnetic recording using a head and a medium, further improvements have been demanded in performance of thin film magnetic heads and magnetic recording media in view of an increase in recording density of magnetic disk devices. For the thin film magnetic heads, composite type thin film magnetic heads formed by lamination of a reading magnetoresistive (MR) element and a writing electromagnetic conversion element are being widely used.

In contrast, the magnetic recording medium is a so-called non-continuous medium, in which magnetic particles are aggregated. Each magnetic particle has a single magnetic domain. Here, a single recording bit is formed by a plurality of magnetic particles. Therefore, to increase magnetic density, the size of the magnetic particles must be reduced, and asperity at a border of recording bits needs to be minimized. However, if the size of the magnetic particles is reduced, there is a problem that thermal stability for magnetization of the magnetic particles is lowered as the volume of the magnetic particles is reduced.

To address this problem, increasing magnetic anisotropic energy Ku of magnetic particles may be considered. However, this increase in Ku causes an increase in anisotropic magnetic field (coercive force) of the magnetic recording medium. On the other hand, the upper limit of the writing magnetic field intensity for the thin film magnetic head is determined substantially by a saturation magnetic flux density of a soft magnetic material forming a magnetic core in the head. As a result, when the anisotropic magnetic field of the magnetic recording medium exceeds an acceptable value determined from the upper value of the writing magnetic field intensity, writing becomes impossible. Currently, as a method to solve such a problem of thermal stability, a so-called thermally-assisted magnetic recording method has been proposed, which uses a magnetic material with a large Ku, which also performs the writing by heating the magnetic recording medium immediately before applying the writing magnetic field to reduce the anisotropic magnetic field.

For this thermally assisted magnetic recording method, a method that uses a near-field probe, a so-called plasmon antenna, is known. The near-field probe is a piece of metal that generates near-field light from a plasmon excited by irradiated laser light. For example, a plasmon-generator that includes a metal scatterer having a shape of a cone or the like formed on a substrate is disclosed in U.S. Pat. No. 6,768,556. In addition, a configuration is disclosed in U.S. Patent Publication No. 2004/081031 A1, in which a plasmon-generator is formed at a position to contact the main pole of a perpendicular magnetic recording head so that an irradiated surface of the plasmon-generator is perpendicular to the magnetic recording medium. Moreover, U.S. Patent Publication No. 2003/066944 A1 discloses a technology, in which irradiation of stronger near-field light onto the magnetic recording medium is attempted by preferentially positioning the front end of a plasmon antenna close to the magnetic recording medium.

The inventors of the present application have considered the potentiality of the magnetic recording by irradiation of the near-field light to be a breaking point and have been developing more improved thermally-assisted magnetic recording heads.

For performing thermally assisted recording by the irradiation of the near-field light with a magnetic recording head, it is necessary to integrate a laser light generating device, which is a light emitting element that is a light source, in the magnetic recording head, to take in laser light emitted from the laser light generating device into an optical waveguide, and to guide the laser light to a plasmon antenna located near a position facing the magnetic recording medium.

A method of forming a light source unit with a light source on a light source supporting substrate separate from a slider which is then overlaid and fastened to a surface on a side opposite to an air bearing surface (ABS) of a slider can produce a thermally assisted magnetic head with favorable yield because the slider with the magnetic head part and the light source unit are independently tested and then a proper slider and light source unit are fastened together. Furthermore, in this case, the light source can be provided at a location away from the ABS and in proximity to the slider. Therefore, there are merits that the light propagation efficiency is favorable and the configuration of the entire device is simplified.

However, precise alignment of the light source and the waveguide when fastening the slider and the light source unit is not easy. Poor alignment precision leads to lower heating efficiency of the medium and major problems occur when performing thermally assisted magnetic recording.

In order to resolve these problems, means for enhancing alignment precision between the light source and the waveguide is disclosed in US Patent Publication 2008/0055784 (JP Unexamined Patent Application 2008-059694). Therein, means is proposed where a first waveguide and a second waveguide are provided at a prescribed interval, and a first alignment process is performed using the second waveguide so as to maximize light intensity. Next, after the first alignment process, a second alignment process is performed where the light source unit is moved in a predetermined direction and distance based on the positional relationship between the second waveguide and the first waveguide.

The aforementioned proposal is based on an extremely excellent concept; however, precisely aligning the light source and the waveguide so as to maximize the light intensity using one waveguide in the first alignment process is an operation that requires time, and determining the alignment precision is difficult.

The present invention further improves on the aforementioned proposed technology, and provides a head structure that allows simple and higher precision alignment between the light source and the waveguide when fastening the slider and the light source unit.

SUMMARY OF THE INVENTION

In order to solve the above drawbacks, a thermally assisted magnetic recording head of the present invention includes: a slider with an air bearing surface; and a light source unit comprising a light source formed on a light source supporting substrate; wherein the slider includes a slider substrate and a magnetic head part formed on a side surface position of the air bearing surface of the slider substrate; the magnetic head part includes a magnetic recording element part that generates a magnetic field for writing, a main waveguide for assistance for receiving light from a back end surface located on a side opposite to the air bearing surface and guiding the light in the direction of the air bearing surface, and a dummy waveguide component part provided in parallel to the main waveguide for assistance in order to align the light source and the waveguide; and the dummy waveguide component part includes a pair of waveguides having the same shape and dimensions including a first waveguide and a second waveguide that receive light from the back end surface positioned on the side opposite to the air bearing surface and guides the light toward the direction of the air bearing surface, wherein light emitting ends of the first waveguide and the second waveguide facing towards the air bearing surface have no shielding material, and are in a free condition so that the light intensity from the light emitting ends can be measured, the light generated by the light source of the light source unit is introduced respectively from back end part sides of the first waveguide and the second waveguide, and the light source can be temporarily aligned to a center position of an interval between the first waveguide and the second waveguide so that the intensity of the light emitted from the light emitting ends of the first waveguide and the second waveguide in the direction of the air bearing surface becomes the same.

In a preferred embodiment of the thermally assisted magnetic recording head of the present invention, the main waveguide for assistance is formed at a preset distance from the center position of the interval between the first waveguide and the second waveguide, and the light source is moved to the position of the main waveguide for assistance that is placed at a fixed distance so that the light source and the main waveguide for assistance can be aligned.

In another preferred embodiment of the thermally assisted magnetic recording head of the present invention, the interval distance D1 between the first waveguide and the second waveguide which are component members of the dummy waveguide component part is from 0.4 to 2.0 µm.

In another preferred embodiment of the thermally assisted magnetic recording head of the present invention, the width W1 of the back end surface that receives the light of the first waveguide and the second waveguide that are component members of the dummy waveguide component part is from 0.4 to 6.0 µm, and the width W2 of the light emitting end in the opposite direction is from 0.3 to 1.5 µm.

In another preferred embodiment of the thermally assisted magnetic recording head of the present invention, the distance D2 from the back end surface that receives the light of the first waveguide and the second waveguide that are component members of the dummy waveguide component part is from 0.1 to 4.0 µm.

A head gimbal assembly of the present invention includes; the thermally assisted magnetic recording head described above, and a suspension that elastically supports the slider.

A hard disk device of the present invention includes the thermally assisted magnetic recording head according to claim 1, and an alignment device that supports the slider and aligns with regards to the recording medium.

In a method of aligning the light source and the main waveguide for assistance in the thermally assisted magnetic recording head described above, the method includes: introducing the light generated by the light source of the light source unit respectively from the back end part sides of the first waveguide and the second waveguide that are formed in the dummy waveguide component part, and temporarily aligning the light source to a center position of the interval between the first waveguide and the second waveguide so that the intensity of the light emitted from the light emitting ends in the direction of the air bearing surface of the first waveguide and the second waveguide become the same, and then moving the light source by sliding from the center position of the interval between the first waveguide and the second waveguide towards the track width direction to the center position of the main waveguide for assistance that is formed at a preset separating distance S, and then aligning the light source and the main waveguide for assistance.

DETAILED DESCRIPTION OF THE INVENTION

Figure 1:
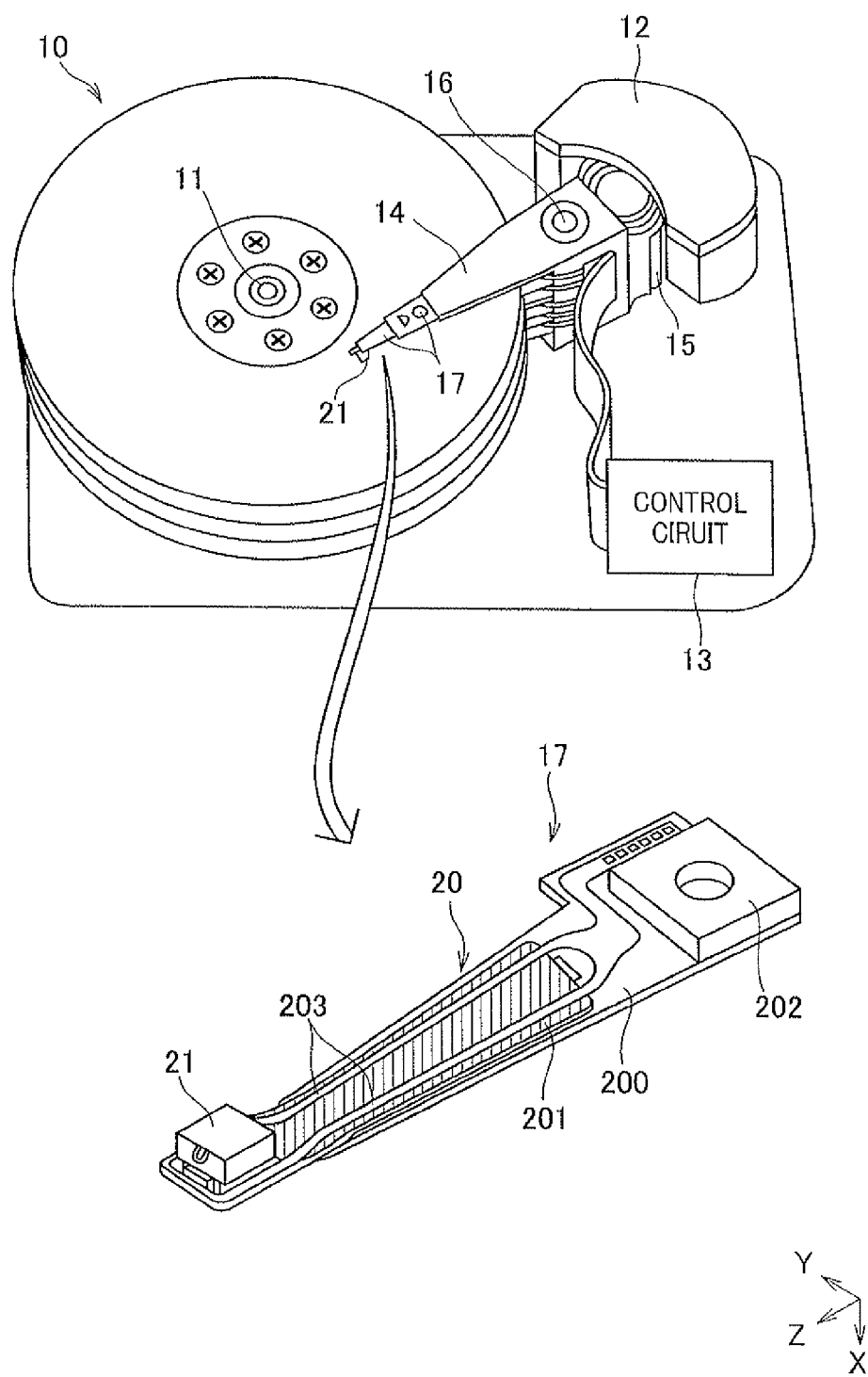
FIG. 1 is a perspective view schematically illustrating a hard disk device (magnetic recording device) and a configuration of the main parts of a head gimbal assembly (HGA) according to one embodiment.

A configuration for implementing the present invention is described below in detail while referring to the attached drawings.

Before describing the thermally assisted magnetic recording head, terminologies used in the present specification are defined. With the multilayer structure and element structure formed on an element formation surface of a slider substrate in the magnetic recording head, the substrate side is a "lower side," and the opposite side is an "upper side," as seen from a reference layer or element. Moreover, in embodiments of the magnetic head, "X, Y and Z directions" are provided in some drawings as necessary. The Z axis direction corresponds to the aforementioned upper-lower direction. The +Z side corresponds to the trailing side, and the −Z side corresponds to the reading side. The Y axis direction corresponds to the track width direction, and the X axis direction corresponds to the height direction (depth direction). Further, in the description of the magnetic recording head, "side surfaces" of the waveguide provided in the magnetic recording head indicate end surfaces other than the end surfaces that are perpendicular to the propagation direction (−X direction) of the light that propagates through the waveguide from all end surfaces surrounding the waveguide. Therefore, the "upper surface" or the "lower surface" of the waveguide in the description of the magnetic recording head is also considered to be one "side surface." The "side surface" is the surface in which the light that propagates through the waveguide, which corresponds to the core, is totally reflected.

In the drawings, identical elements are identified using identical reference numbers.

Furthermore, the dimensional ratios inside component elements and between component elements in the drawings are arbitrary and are not illustrated to an accurate scale, for ease of viewing the drawings.

In FIG. 1, the configuration of the main parts of one embodiment of the hard disk device and the head gimbal assembly (HGA) of the present invention is schematically illustrated as a perspective view.

(Description of Hard Disk Device Configuration)

In FIG. 1, the hard disk device includes a plurality of magnetic disks 10 which are magnetic recording media, that rotate around a rotational shaft of a spindle motor 11, an assembly carriage device 12 for positioning a thermally assisted magnetic head 21 on a track, and a recording/reproducing and a light emission control circuit (control circuit) 13 for controlling the reading and writing operation of the thermally assisted magnetic head 21 and controlling a laser diode that is a light source that generates laser light for thermally assisted magnetic recording as described below in detail.

A plurality of drive arms 14 are provided in the assembly carriage device 12, and these drive arms 14 are configured to be able to rock around a pivot bearing shaft 16 by a voice coil motor (VCM) 15. A leading edge part of the drive arm 14 is attached to a head gimbal assembly 17 (hereinafter referred to as "HGA 17"). Furthermore, a thermally assisted magnetic head 21 is provided on each HGA 17 so as to face the surface of each of the magnetic disks 10 (also referred to as "magnetic recording medium").

The surface facing the surface of the magnetic disk 10 is an ABS of the thermally assisted magnetic head 21. Note, the number of the magnetic disk 10, the drive arm 14, the HGA 17 and the thermally-assisted magnetic head 21 may be singular.

(Description of HGA Configuration)

As illustrated in the expanded view at the bottom of FIG. 1, the HGA 17 has a thermally assisted magnetic head 21 on a leading edge part of a suspension 20, and is configured such that one end of a wiring member 203 is electrically connected to a terminal electrode of the thermally assisted magnetic head 21.

The suspension 20 is configured with a load beam 200, an elastic flexure 201 attached and supported on the load beam 200, a base plate 202 provided on a base of the load beam 200, and a wiring member 203 on the flexure 201 made from a lead conductor and connection pads that are electrically connected on both ends thereof.

The wiring member is configured for example with a pair of electrode pads for a recording signal, a pair of electrode pads for a reading signal, and a pair of electrode pads for driving a light source, and the like.

Note, the structure of the suspension in the aforementioned HGA 17 of the present invention is a preferred example, but there is no restriction to this structure.

(Description of Configuration of Thermally Assisted Magnetic Head)

Figure 2:
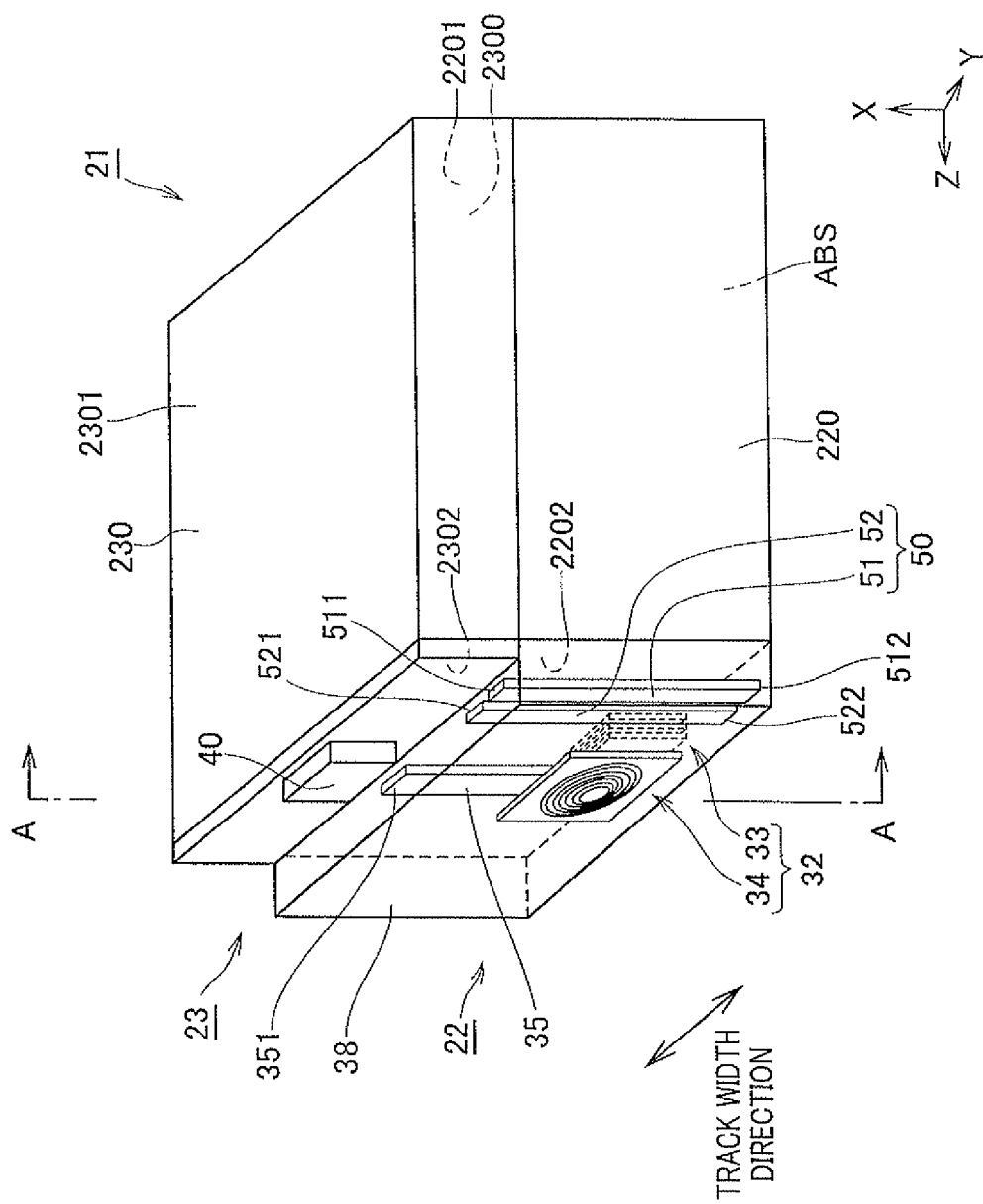
FIG. 2 is a perspective view schematically illustrating a configuration of a main part of a thermally assisted magnetic recording head according to the present invention.
Figure 3:
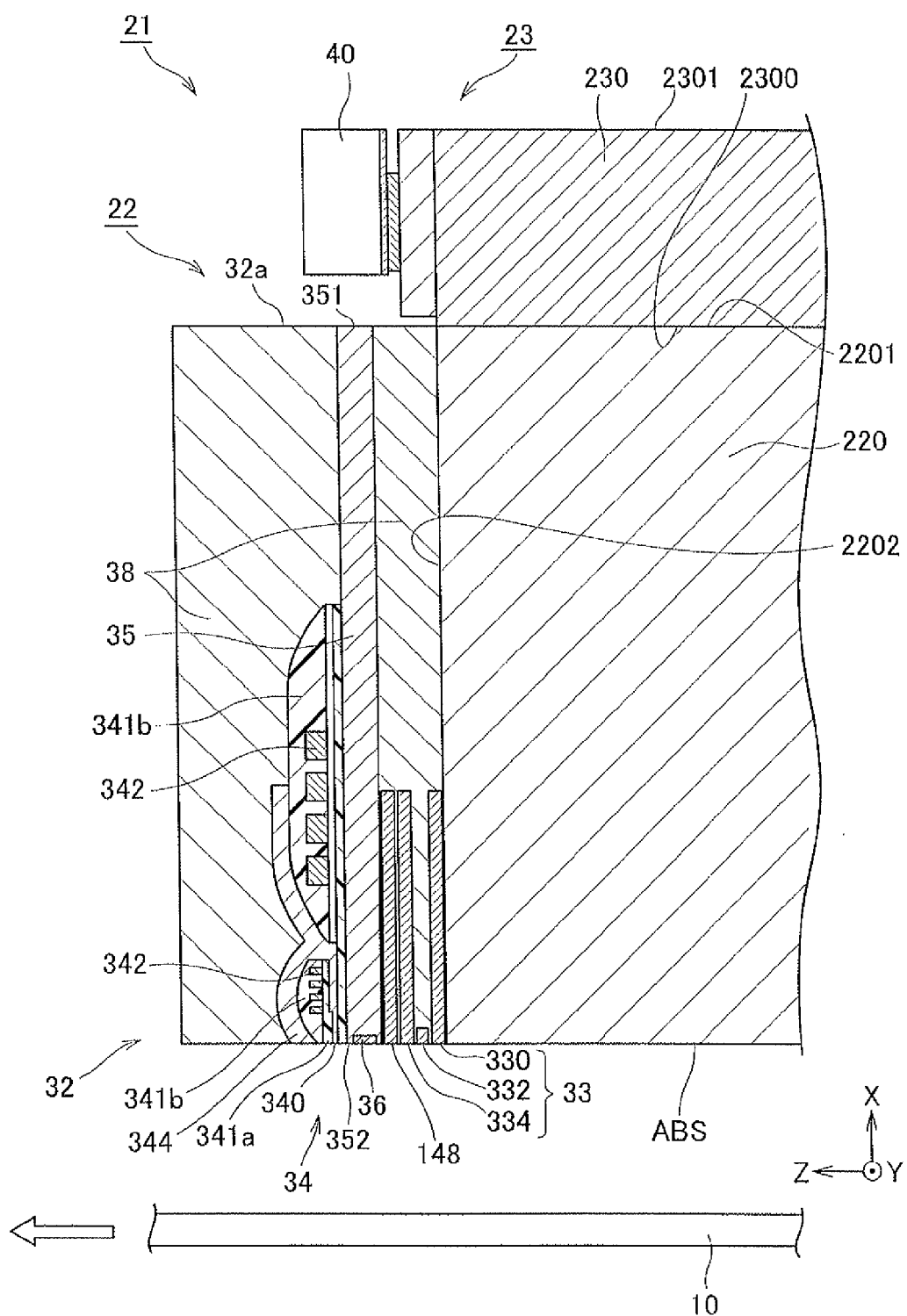
FIG. 3 is a cross-sectional view at plane A-A as viewed in the direction of the arrows in FIG. 2, schematically illustrating a configuration of the main part of the thermally assisted magnetic recording head.

As illustrated in FIG. 2 and FIG. 3, the thermally assisted magnetic head 21 is configured with a slider 22 and a light source unit 23 bonded to the slider 22.

The light source unit 23 is configured with a light source supporting substrate 230 and a laser diode 40, which is a light source for thermally assisted recording, formed on the substrate 230.

The slider 22 has a slider substrate 220 and a magnetic head part 32 formed on a side surface position of the ABS of the slider substrate 220.

With regards to the bond between the slider 22 and the light source unit 23, a back surface 2201 of the slider substrate 220 and a joining surface 2300 of the light source supporting substrate 230 are attached together by bonding both surfaces together in a surface contact condition. Note, the back surface 2201 of the slider substrate 220 is located on the surface of the slider 22 on the side opposite to the ABS, and using the condition of FIG. 1 as a reference, a bottom surface 2301 of the light source supporting substrate 230 is joined to the flexure 201 of FIG. 1.

The slider 22 has a slider substrate 220 and a magnetic head part 32 formed on the slider substrate. Reading and writing of data signals to the magnetic disk is performed by the magnetic head part 32.

The slider substrate 220 has a plate-like configuration and has an ABS that is processed so as to attain a suitable flying height. The slider substrate 220 is formed for example from conductive ALTIC ($Al_2O_3$—TiC).

The magnetic head part 32 is formed on a collecting surface 2202 which is a side surface essentially perpendicular to the ABS of the slider substrate 220.

The magnetic head part 32 has a magnetoresistive (MR) element part 33 as a magnetic detecting element that reads magnetic information, a magnetic recording element part 34 that writes magnetic information by creating a magnetic field, a main waveguide 35 for assistance formed in proximity to a pole for writing of the magnetic recording element part 34 as a planar waveguide that guides laser light for thermally assisted recording, and a dummy waveguide component part 50 with a pair of dummy waveguides 51 and 52 provided at positions separated in the track width direction from the main waveguide 35 for assistance.

The configuration of the main waveguide 35 for assistance and the dummy waveguide component part 50 is a main part of the present invention, and is described later.

Furthermore, a plasmon-generator 36 that generates near-field light in order to heat the recording layer part of a magnetic disk is formed near the ABS of the main waveguide 35 as schematically illustrated in FIG. 3. Furthermore, an insulation layer 38 is formed on the collecting surface 2202 so as to cover the MR element part 33 for recording/reproducing, the magnetic recording element part 34 for magnetic recording, the main waveguide 35 for assistance, the dummy waveguide component part 50 and the like.

Although not illustrated in the drawings, a pair of electrode pads for signal terminals that are connected to the MR element part 33, a pair of electrode pads for signal terminals that are connected to the magnetic recording element part 34, an electrode pad for grounding that is electrically connected to the slider substrate and the like are formed on the surface of the insulation layer 38.

As illustrated in FIG. 3, the end surfaces of the MR element part 33, the magnetic recording element part 34, and the plasmon-generator 36 are exposed to the ABS. Note, the end surfaces of the pair of waveguides 51 and 52 that compose the dummy waveguide component part 50 that will be discussed later are also exposed to the ABS. This is so that the light source can be aligned temporarily at the center position of the interval between the pair of waveguides 51 and 52 by comparing the ratios for the light amount of the spots coming from the end surfaces (first alignment).

As illustrated in FIG. 3, the MR element part 33 which is a reproduction element has a configuration that includes an MR element main body 332, and a lower shield layer 330 and an upper shield layer 334 that sandwich the MR element main body 332.

The lower shield layer 330 and the upper shield layer 334 are made of a magnetic material such as NiFe, CoFeNi, CoFe, FeN, or FeZrN or the like with a thickness of approximately 0.5 to 3 µm formed by a pattern plating method or the like that includes a frame plating method for example.

The MR element main body 332 includes magnetoresistive effect films such as a current in plane (CIP)-giant magneto resistance (GMR) multilayer film, current perpendicular to plane (CPP)-GMR multilayer film, and tunnel magneto resistance (TMR) multilayer film, and can perceive signal magnetic fields from a magnetic disk with extremely high sensitivity.

In the example of FIG. 3, an inter-element shield layer 148 made from the same material as the lower shield layer 330 is formed between the MR element part 33 and the main waveguide 35 for assistance. The inter-element shield 148 shields the MR element part 33 from magnetic fields generated by the magnetic recording element part 34 and plays a role in preventing noise from the outside during reading.

Note, reference number 38 represents an insulation layer 38 formed of alumina or the like for example. The part that is formed around the outside of the waveguide acts as so-called cladding.

The magnetic recording element part 34 is preferably for perpendicular magnetic recording, and as illustrated in FIG. 3, includes a main pole layer 340, a gap layer 341a, a coil insulation layer 341b, a coil layer 342, and an auxiliary pole layer 344.

The main pole layer 340 is a magnetic path for converging while guiding the magnetic flux induced by the coil layer 342 to the recording layer of the magnetic disk (medium) for writing.

As illustrated in FIG. 3, the end part on the ABS side of the auxiliary pole layer 344 forms a trailing shield part where the layer cross-section is broader than the other parts of the auxiliary pole layer 344.

The gap layer 341a is formed of an insulation material so as to separate the main pole layer 340 and the auxiliary pole layer 344.

The coil layer 342 is made of copper or the like for example. The back end of the main pole layer 340 and the part of the auxiliary pole layer 344 that is away from the ABS are coupled, and the coupled part is formed so as to be enclosed by the coil layer 342.

The coil insulation layer 341b separates the coil layer 342 and the auxiliary pole layer 344, and is made of an electrical insulation material such as a thermoset resist layer for example.

As illustrated in FIG. 3, the main waveguide 35 for assistance as a configuration in the shape of a flat plate with a rectangular cross-section, or in other words as a flat waveguide, extends parallel to the collecting surface 2202 between the MR element part 33 and the magnetic recording element part 34, and extends from the ABS of the magnetic head part 32 to a surface 32a on the side opposite to the ABS of the magnetic head part 32.

The main waveguide 35 for assistance is formed as a flat waveguide formed perpendicular to the ABS. An insulation layer 38 that functions as cladding for the waveguide 35 and has smaller refractive index than the main waveguide 35 for assistance is formed on the periphery of the main waveguide 35 for assistance.

As illustrated in FIG. 3, the main waveguide 35 for assistance can guide light incident from an entering surface 351 to the exiting surface 352 which is the end surface near the ABS while the light propagates through the waveguide 35.

The width of the main waveguide 35 for assistance in the track width direction can be from 1 to 200 µm for example, and the thickness can be from 0.2 to 10 µm for example. Note, as described below, the main waveguide 35 for assistance preferably has a configuration that provides a tapered part that gradually reduces the width of the waveguide.

The main waveguide 35 for assistance is made from a dielectric material with a refractive index n that is higher than that of the materials that form the insulation layer 38 in any part as described above. For example, when the insulation layer 38 is formed of $SiO_2$ (n=1.5), the main waveguide 35 for assistance may be formed of $Al_2O_3$ (n=1.63). Furthermore, when the insulation layer 38 is formed of $Al_2O_3$ (n=1.63), the main waveguide 35 for assistance may be formed of $Ta_2O_5$ (n=2.08), $Nb_2O_5$ (n=2.33), TiO (n=2.3 to 2.55), or $TiO_2$ (n=2.3 to 2.55). By making the main waveguide 35 for assistance of these materials, propagation loss is minimized by the intrinsic favorable optical properties of the material, and the near-field light generating efficiency is increased.

The plasmon-generator 36 of the present embodiment is illustrated concisely in the example of FIG. 3, but is a plate-like member provided near the center of the exiting surface 352 of the main waveguide 35 for assistance. The plasmon-generator 36 is embedded in the exiting surface 352 of the main waveguide 35 for assistance such that the end surface is exposed to the ABS.

Figure 4:
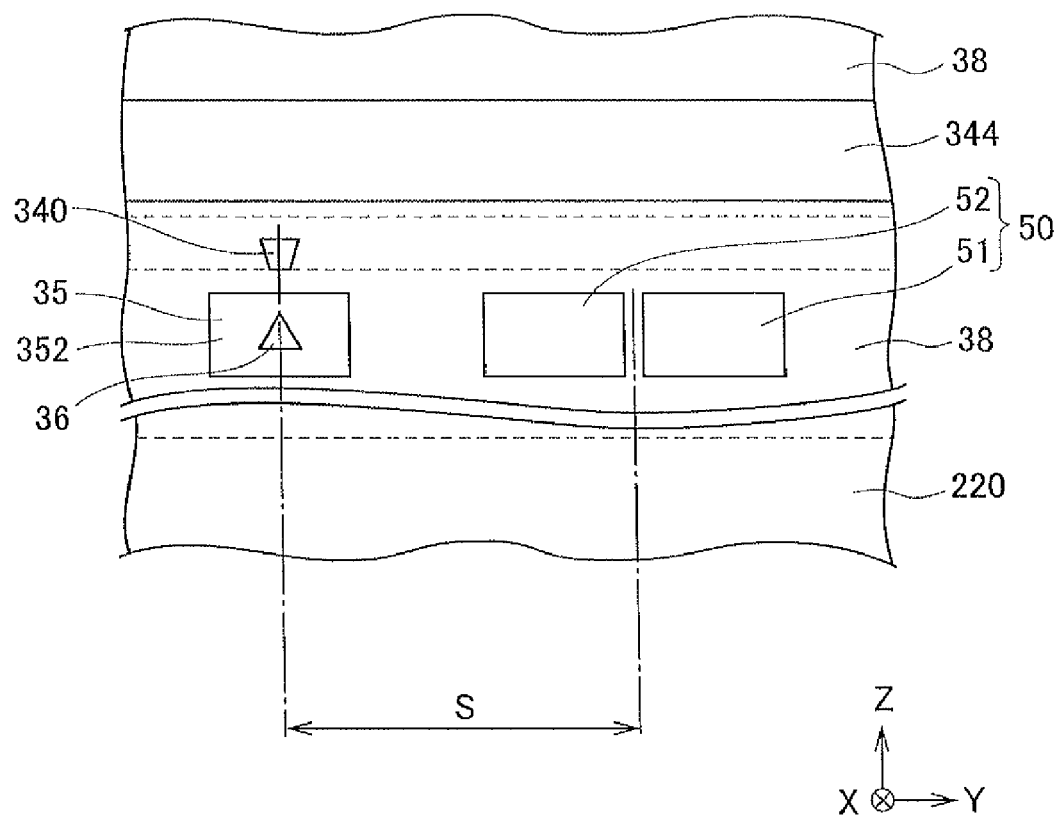
FIG. 4 is a plan view of the ABS of the thermally assisted magnetic recording head of the present invention, illustrating only the main parts requiring description.

The condition of a flat configuration of the plasmon-generator 36 embedded in the exiting surface 352 of the main waveguide 35 for assistance is illustrated in FIG. 4. Furthermore, the positional relationship of the main waveguide 35 for assistance described below and the pair of waveguides 51 and 52 that configure the dummy waveguide component part 50 is illustrated in FIG. 4.

As illustrated in FIG. 4, for example, the plasmon-generator 36 has a triangular shape as seen from the ABS, and is fanned of a dielectric material. The plasmon-generator 36 is preferably formed of Au, Ag, Al, Cu, Pd, Pt, Rh, or Ir, or an alloy that combines a plurality of these materials. The height of the triangular shape as seen from the ABS is sufficiently smaller than the wavelength of the incident laser light, and is preferably from 20 to 400 nm. The width of the bottom edge of the triangular shape is also sufficiently smaller than the wavelength of the incident laser light, and is preferably from 20 to 400 nm.

When this type of plasmon-generator 36 is provided on the exiting surface 353 of the main waveguide 35 for assistance, an electric field concentrates near the vertex of the plasma generator 36, and near-field light is generated from the proximity of the vertex toward the magnetic disk 10. As a result, the magnetic recording layer part of the magnetic disk 10 is heated. Accordingly, an anisotropic magnetic field (coercive force) of that part decreases to a value at which the writing of data can be performed. Immediately thereafter, a writing magnetic field generated from the leading edge of the main pole layer 340 is applied to that part to perform writing. By following these procedures, thermally-assisted magnetic recording can be performed.

(Configuration Combining Main Waveguide 35 for Assistance and Another Plasmon-Generator 36')

Figure 8:
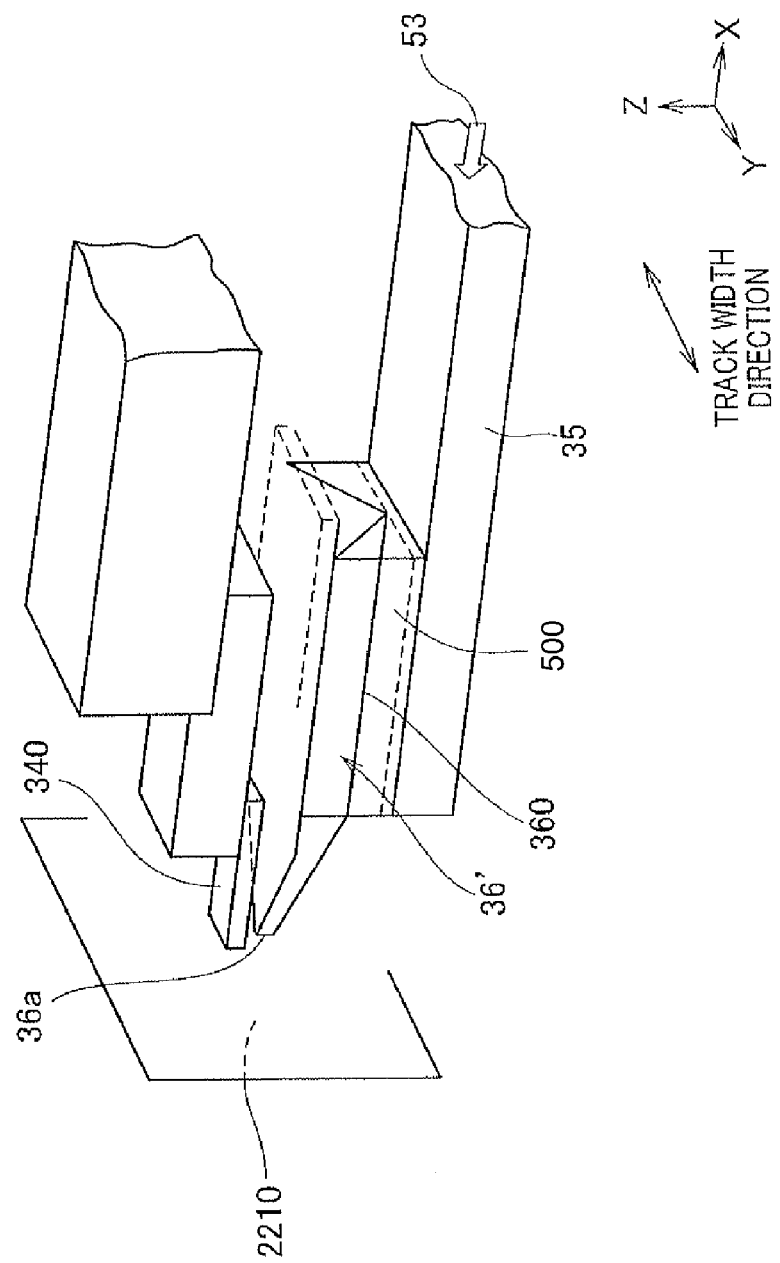
FIG. 8 is a perspective view of another configuration of a head structure, schematically illustrating a configuration including a main waveguide for assistance, a plasmon-generator, and a main pole layer.

FIG. 8 is a perspective view schematically illustrating a configuration including the main waveguide 35 for assistance, an alternate configuration of a plasmon-generator 36', and the main pole layer 340. In this figure, the head part end surface 2210, which includes a position that irradiates the writing magnetic field and the near-field light towards the magnetic recording medium, is positioned on the left side.

As illustrated in FIG. 8, the main waveguide 35 for assistance is provided for propagating laser light 53 for generating the near-field light, and the plasmon-generator 36' is provided that includes a propagative edge 360, which is an edge where the surface plasmon excited by the laser light 53 propagates.

In addition, the part sandwiched by a part of a side surface of the main waveguide 35 and a part of the lower surface that includes the propagative edge 360 of the plasmon-generator 36', which faces the part of the side surface, forms a buffer portion 500. In other words, a part of the propagative edge 360 is covered by the buffer portion 500.

The buffer portion 500 functions to couple the laser light 53 with the plasmon-generator 36' in the surface plasmon mode. Furthermore, the buffer portion 500 may be a part of a passivation layer 38 or may be an additional layer provided separately from the passivation layer 38.

The plasmon-generator 36' includes a near-field generating end surface 36a that extends to the head part end surface 2210. The near-field generating end surface 36a is adjacent to the leading edge part of the main pole layer 340. Furthermore, the propagative edge 360 extends to the near-field generating end surface 36a from a part that is covered by the buffer portion 500, at which the laser light 53 is coupled in the surface plasmon mode. The propagative edge 360 functions to allow the surface plasmon excited by the laser light 53 to propagate to the near-field generating end surface 36a.

Furthermore, in the plasmon-generator 36', the leading edge cross-section has a triangular shape along the Y-Z surface.

The plasmon-generator 36' is preferably formed of a conductive material, such as a metal like Pd, Pt, Rh, Ir, Ru, Au, Ag, Cu or Al, or an alloy made of at least two types of these elements.

The buffer portion 500 is formed by a dielectric material that has a lower refractive index than the refractive index of the waveguide 35.

The laser light 53 that has advanced to the vicinity of the buffer portion 500 is optically coupled to the waveguide 35 having a prescribed refractive index, the buffer portion 500 having a prescribed refractive index, and the plasmon-generator 36' formed by a conductive material such as metal, and excites a surface plasmon mode on the propagative edge 360 of the plasmon-generator 36'. In other words, the laser light 53 is coupled to the plasmon-generator 36 in the surface plasmon mode.

In actuality, evanescent light is excited in the buffer portion 500 from the optical interfacial state between the waveguide 35, which is a core, and the buffer portion 500. Next, the surface plasmon mode is induced and the surface plasmon is excited by coupling the evanescent light and a fluctuation of charge excited on the metal surface (propagative edge 360) of the plasmon-generator 36'.

In the induced surface plasmon mode, the surface plasmon is excited on the propagative edge 360 of the plasmon-generator 36' and propagates on the propagative edge 360 along the ABS direction.

As the surface plasmon propagates, the surface plasmon, or in other words, the electric field, is concentrated on the near-field generating end surface 36a that has a vertex that extends to the head part end surface 2210 and is the destination of the propagative edge 360.

As a result, near-field light is generated from the near-field generating end surface 36a. The near-field light is radiated towards the magnetic recording layer of the magnetic disk 10. The near-field light reaches the surface of the magnetic disk 10 and heats the magnetic recording layer part of the magnetic disk 10. Thereby, an anisotropic magnetic field (coercive force) of that part decreases to a value at which writing can be performed. Immediately thereafter, a writing magnetic field generated from the leading edge of the main pole layer 340 is applied to that part to perform writing. By following these procedures, thermally-assisted magnetic recording can be performed.

Figure 9:
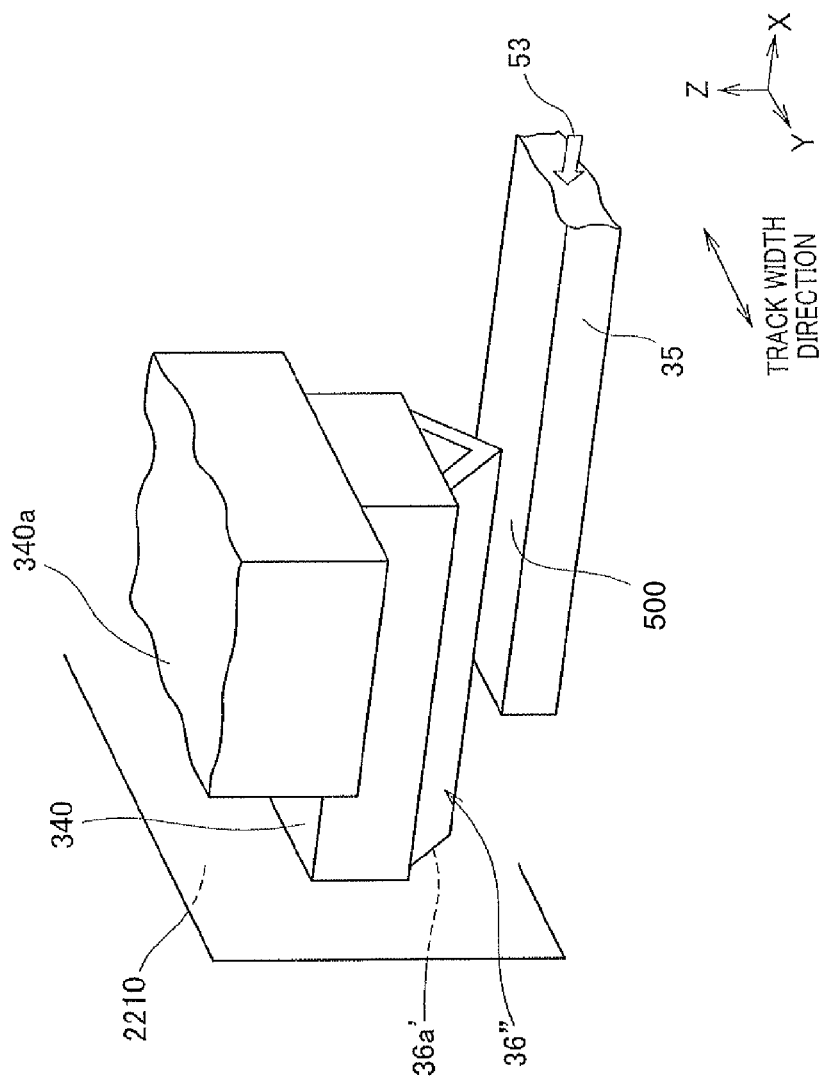
FIG. 9 corresponds to FIG. 8 with a plasmon-generator of another configuration, and is a perspective view schematically illustrating a configuration including the main waveguide for assistance, the plasmon-generator, and the main pole layer.
Figure 10:
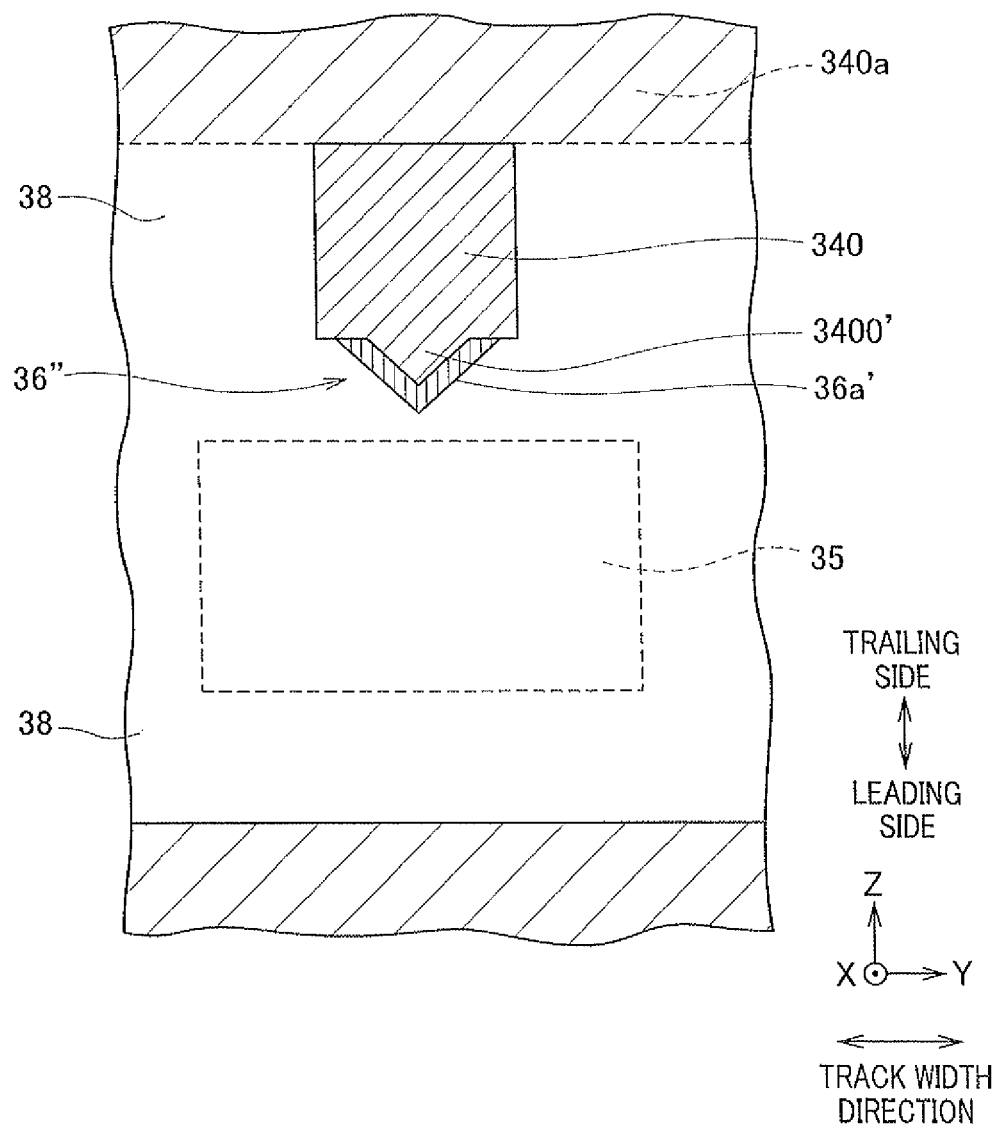
FIG. 10 corresponds to FIG. 9 with a plasmon-generator of another configuration and is a plan view that illustrates shapes of end surfaces of the plasmon-generator and an electromagnetic conversion element on the head part end surface.

Note, the configuration of the plasmon-generator 36' as illustrated in FIG. 8 may be modified to that of a plasmon-generator 36" as illustrated in FIG. 9 and FIG. 10.

The plasmon-generator 36", illustrated in FIG. 9 and FIG. 10, has the end surface 36a' on the ABS side that has a shape with a V-shaped cross-section, and the same shape extends in the X direction. In this case, as illustrated in FIG. 10, the lower part of the main pole layer 340 has a configuration in which a convex part 3400' with a V-shaped cross-section extends in the -Z, direction. The plasmon-generator 36" with the V-shaped cross-section tightly fits on the convex part 3400' with the V-shaped cross-section. The V-shaped leading edge of the plasmon-generator 36" becomes the propagative edge where the surface plasmon mode is induced. In other words, the laser light in the waveguide 35 that has advanced to the vicinity of the buffer portion is coupled with an optical structure between the buffer portion 500 and the plasmon-generator 36" and induces the surface plasmon mode on the propagative edge of the plasmon-generator 36". With the induced surface plasmon mode, surface plasmon is excited on the propagative edge of the plasmon-generator 36" and propagates on the propagative edge in the ABS direction (-X direction). Thereby, near-field light is generated from the ABS end surface of the propagative edge towards the magnetic recording medium.

With such configuration, a near-field light emission element on which the light emitting position is controlled can be placed near a pole, and therefore, the distance between the writing pole and the near-field light emission element can be reduced.

Note, the configuration of the plasmon-generator 36" is not limited to the configuration illustrated in FIG. 9 and FIG. 10. As a variant example, plate-like bodies can be added as wings on both sides (Y and -Y directions) respectively on the upper part of the V-shaped cross-section. Alternatively, the plasmon-generator may have a configuration in which the part near the ABS end surface has a V-shaped cross-section and it expands in a boat shape proceeding towards the depth direction (X direction). In this variant example, naturally the pole may be formed to have a convex shape that tightly fits in a concave part of the plasmon-generator.

(Description of Main Parts of the Present Invention)

The magnetic head part 32 with the aforementioned configuration according to the present invention includes a magnetic recording element 34 that can generate a magnetic field for writing, a main waveguide 35 for assistance that receives light from a back end surface 351 located on the side opposite to the ABS and guides the light toward the ABS, and a dummy waveguide component part 50 provided in parallel to the main waveguide 35 in order to perform alignment between the light source and the waveguide.

Figure 5:
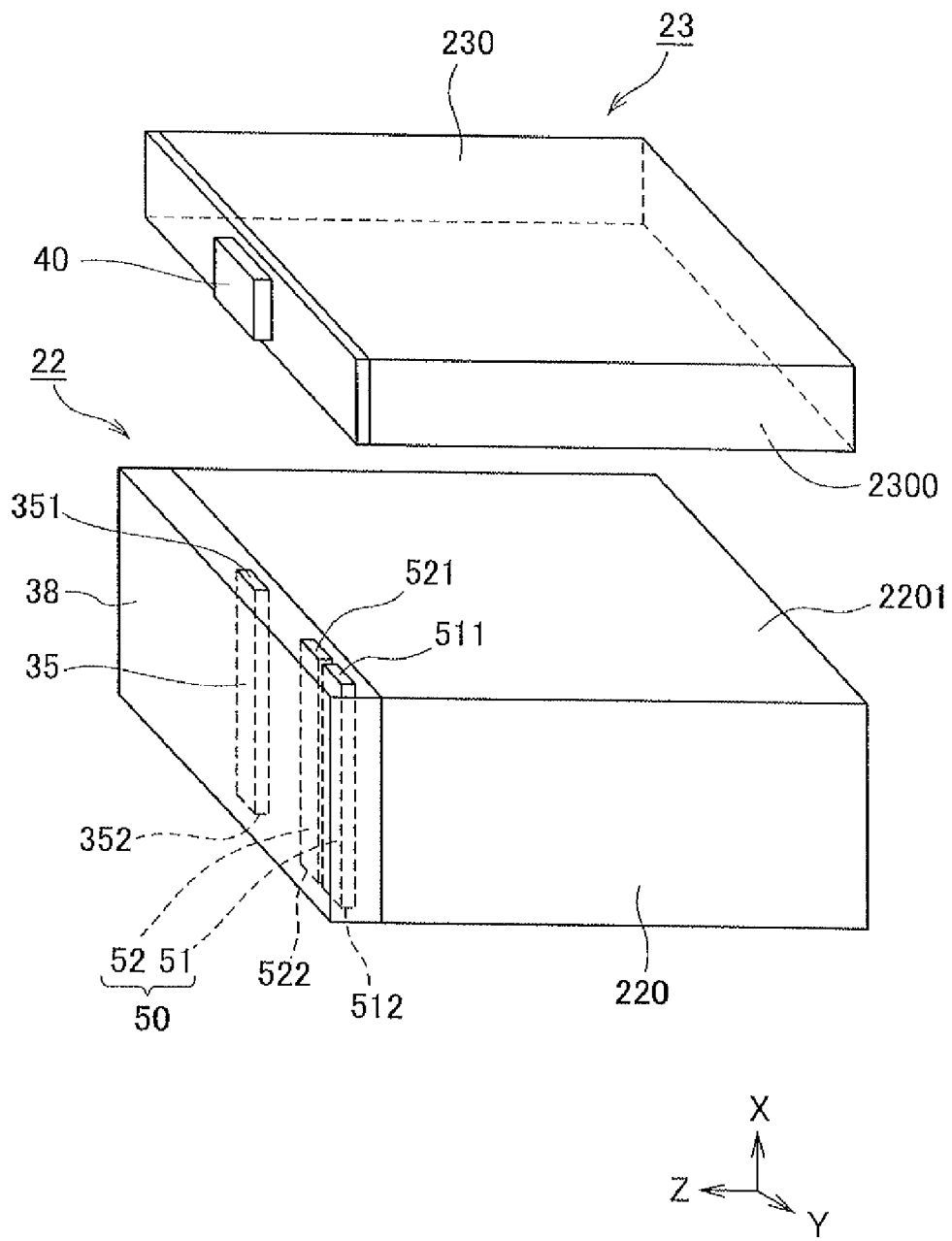
FIG. 5 is a perspective view extracting and illustrating a configuration of a light source of the thermally assisted magnetic recording head of the present invention, and a main waveguide for assistance and a dummy waveguide component part, in particular.
Figure 6:
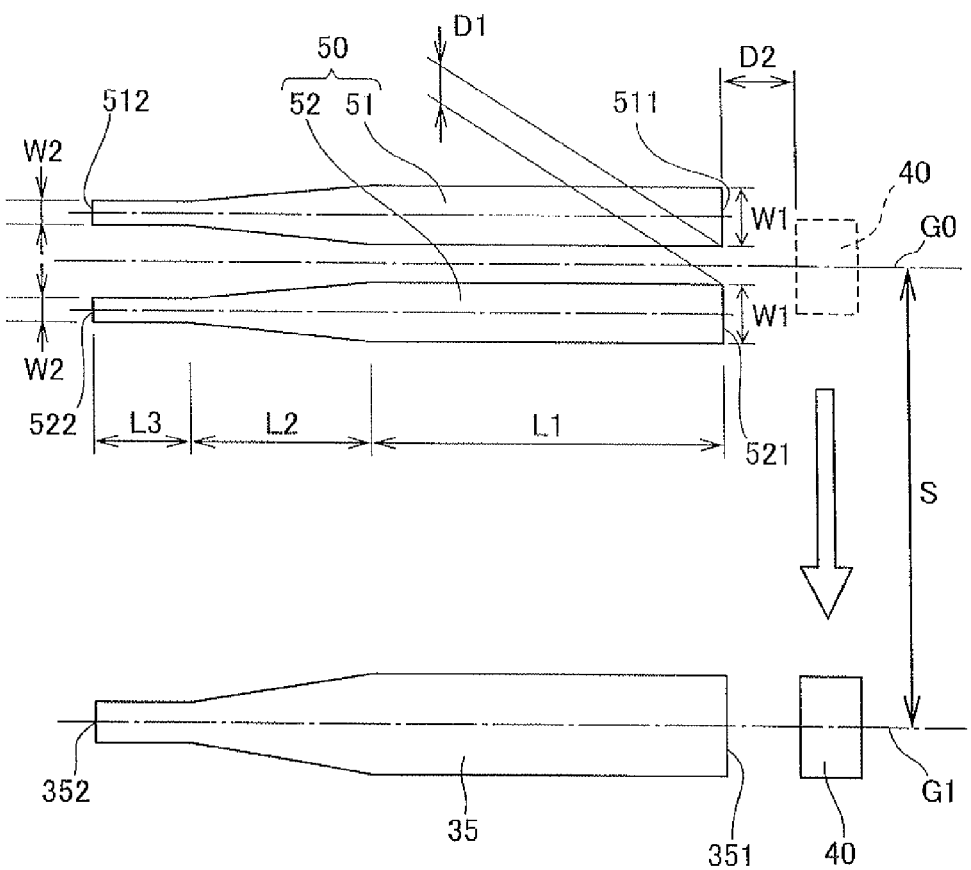
FIG. 6 is a plan view extracting and illustrating a configuration of the main waveguide for assistance and the dummy waveguide component part of the thermally assisted magnetic head of the present invention.
Figure 6:
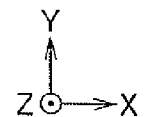

Furthermore, as illustrated in FIG. 5 and FIG. 6 (particularly in FIG. 6), the dummy waveguide component part 50 has a structure that combines a pair of waveguides with the same shape and dimensions including a first waveguide 51 and a second waveguide 52 that receive light from back end surfaces (511 and 521) located on the side opposite to the ABS and guides the light in the ABS direction.

Light emitting ends 512 and 522 in the ABS direction of the first waveguide 51 and the second waveguide 52 have no shielding material, and are in a free condition. Therefore, the light intensity from the light emitting ends can be measured.

Furthermore, light emitted from the light source 40 of the light source units (laser diode 40 which is a light source) enters into both waveguides 51 and 52 from each of the back end part sides (511 and 521) of the first waveguide 51 and the second waveguide 52. The light source 40 can be temporarily aligned (first alignment operation) at a central position $G_0$ of an interval between the first waveguide 51 and the second waveguide 52, so that the intensity of the light emitted from the light emitting ends 512 and 522 in the air bearing surface direction of the first waveguide 51 and the second waveguide 52 become the same.

In other words, by comparing the light intensity of two spots from the light emitting ends 512 and 522 using the waveguides 51 and 52, the position where the intensity is the same can be determined to be the central position $G_0$.

Figure 7A:
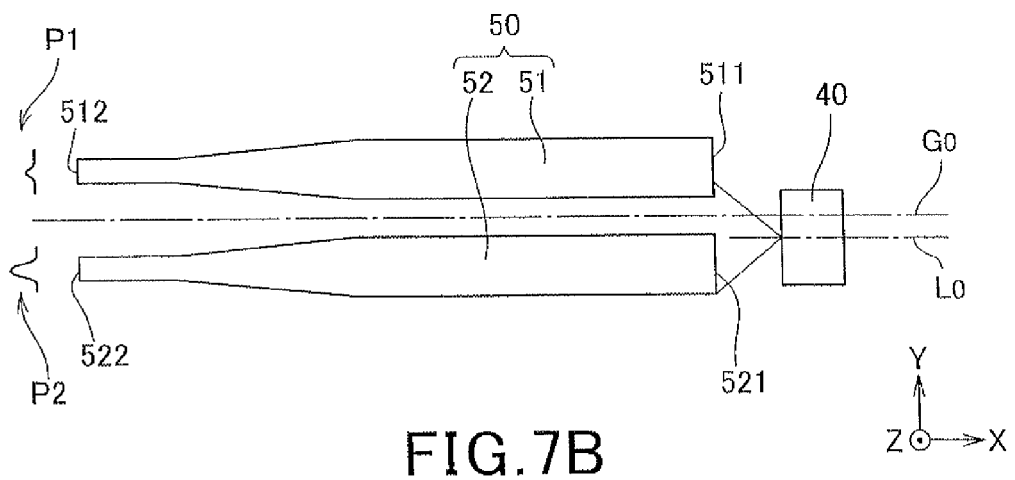
FIG. 7A through FIG. 7C are plan views illustrating various relationships between the dummy waveguide component part and the light source in order to describe the function of a first alignment that temporarily aligns the light source in a center position of an interval between a first waveguide and a second waveguide.
Figure 7B:
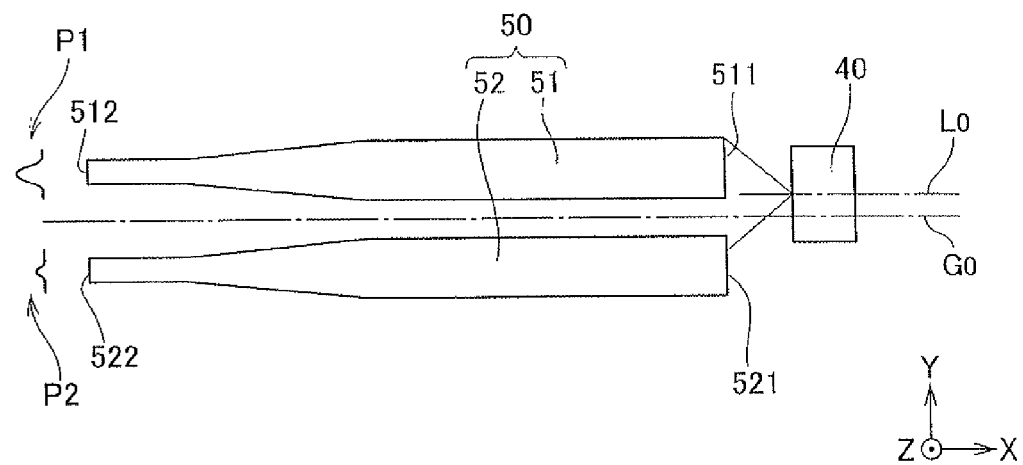
Figure 7C:
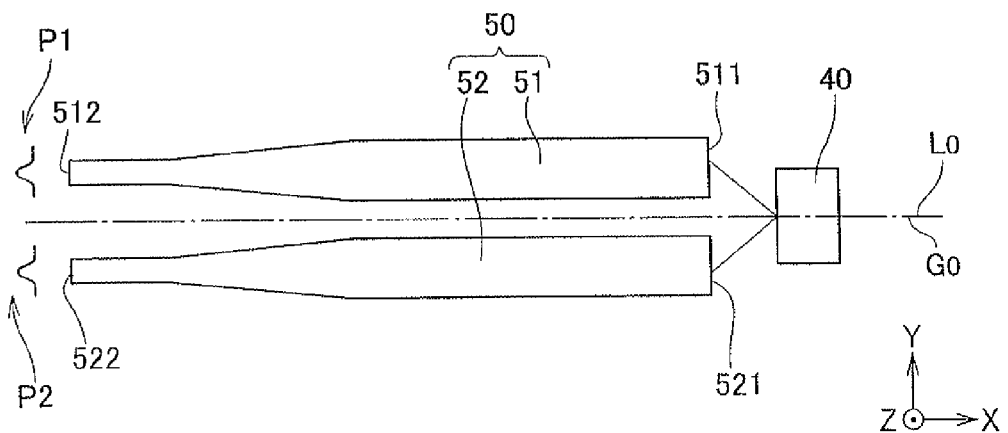

The specific operation is illustrated in FIG. 7A through FIG. 7C.

FIG. 7A is a drawing of a condition where shifting has occurred between a center position $L_0$ of the light source 40 and the central position $G_0$ of the interval between the first waveguide 51 and the second waveguide 52, and the light source 40 is moved too far toward the second waveguide 52 side. When the light intensity P1 and P2 of the two spots from the light emitting ends 512 and 522 are compared, P1<P2, so it can be determined that the alignment of the central position $G_0$ and the center position $L_0$ of the light source 40 is imperfect. Note, the light intensity P1 and P2 of the two spots from the light emitting ends 512 and 522 are simply and schematically illustrated in the drawings in a range that allows understanding, and the peak height in the −X direction corresponds to the light intensity.

FIG. 7B is a drawing of a condition where shifting has occurred between the center position $L_0$ of the light source 40 and the central position $G_0$ of the interval between the first waveguide 51 and the second waveguide 52, and the light source 40 is moved too far toward the first waveguide 51 side. When the light intensity P1 and P2 of the two spots from the light emitting ends 512 and 522 are compared, P1>P2, so it can be determined that the alignment of the central position $G_0$ and the center position $L_0$ of the light source 40 is imperfect.

FIG. 7C illustrates the case where the center position $L_0$ of the light source 40 and the central position $G_0$ of the interval between the first waveguide 51 and the second waveguide 52 are aligned, and when the light intensity P1 and P2 of the two spots from the light emitting ends 512 and 522 are compared, P1=P2, and therefore it can be determined that precise alignment of the central position $G_0$ and the center position $L_0$ of the light source 40 has been achieved.

As illustrated in FIG. 6, the central position $G_0$ of the interval between the first waveguide 51 and the second waveguide 52 in the dummy waveguide component part 50 that is precisely aligned with the light source 40 is used as a starting point. The light source 40 is moved in the −Y direction (corresponding to the track width direction) to a center line G1 of a position of the main waveguide 35 for assistance that is formed at a location of a predetermined separating distance S away from the $G_0$ position. Thereby, this configuration can align the light source 40 and the main waveguide 35 for assistance (second alignment).

The separating distance S can very precisely and easily be set beforehand during the steps of a head thin-film process. In other words, when forming the first waveguide 51 and the second waveguide 52 in the dummy waveguide component part 50 as well as the main waveguide 35 for assistance, the pattern groups of the waveguides can be formed at one time with a single exposure process using photoresist means, and therefore the separating distance S can very precisely and easily be achieved.

Furthermore, as illustrated in FIG. 2, when moving the light source 40 in the −Y direction (track width direction) for example, a piezoelectric actuator may be used to mechanically move the light source 40 until reaching the separating distance S while the center position in the Z direction of the light source 40 and the center position in the Z direction (thickness direction) of the waveguides are aligned.

Confirmation that movement has reached the separating distance S can be performed by the light leakage from the waveguides, the writing capability and the like.

In FIG. 6, the specification and the placement configuration of the first waveguide 51 and the second waveguide 52 must be suitably set in order to achieve the operation of aligning the center position $L_0$ of the light source 40 and the central position $G_0$ of the interval between the first waveguide 51 and the second waveguide 52.

As described above, the first waveguide 51 and the second waveguide 52 that form a pair as a component member of the dummy waveguide component part 50 are a combination structure of waveguides with the same shape and dimensions.

Furthermore, an interval distance D1 in the Y direction (track width direction) between the first waveguide 51 and the second waveguide 52 which are component members of the dummy waveguide component part 50 must be, at least, no less than $\lambda/n_c$, a relationship between the wavelength λ of the laser diode of the light source 40 used and the refractive index $n_c$ of the waveguide that forms the cladding.

This is in order to prevent mutually interfering actions in the first waveguide 51 and the second waveguide 52. Furthermore, the upper limit value of the interval distance D1 is 2 μM. Therefore, normally D1 is in a range from D1=0.4 to 2.0 μM, and the specification is preferably set in a range from 0.5 to 1.5 μm.

Furthermore, the width W1 of the back end surfaces 511 and 521 that receive the light in the first waveguide 51 and the second waveguide 52 which are component members of the dummy waveguide component part 50 is preferably from 0.4 to 6.0 μm. The width W2 of the light emitting ends 512 and 522 in the opposite direction is set to be from 0.3 to 1.5 μm.

Furthermore, the distance D2 from the back end surfaces 511 and 521 that receive the light of the first waveguide 51 and the second waveguide 52 to the light source is within a range of 6 µm, and a range of 0.1 to 4.0 µm is particularly preferable. When within this range, the coupling efficiency of the waveguide and the laser light generated by the light source 40 becomes 30% or higher, which is preferable.

Furthermore, as illustrated in FIG. 6, the distance L1 from the back end surfaces 511 and 521 that receive the light of the first waveguide 51 and the second waveguide 52 to a tapered part of the waveguide is in a range from 0 to 190 µm. The distance L2 of the tapered part is in a range from 40 to 230 µm. The distance L3 from the end of the tapered part to the light emitting ends 512 and 522 is in a range from 0 to 190 µm.

Note, the specification of the main waveguide 35 for assistance and the specification for the first waveguide 51 and the second waveguide 52 can be the same, but there is no restriction to this, and the first waveguide 51 and the second waveguide 52 can be set within the aforementioned permissible specification range. Note, the first waveguide 51, the second waveguide 52, and the main waveguide 35 for assistance form a so-called waveguide core, and are made from a material with a higher refractive index than the cladding that is formed around the outside thereof. Examples of the component materials can be in accordance with the aforementioned specific examples.

The alignment method of the light source 40 and the main waveguide 35 for assistance in the thermally assisted magnetic recording head that has been described above is reorganized and described below. In other words, the alignment method involves introducing light generated by the light source 40 of the light source unit from the back end parts 511 and 521 side of the first waveguide 51 and the second waveguide 52 that form the dummy waveguide component part 50, and temporarily aligning the light source 40 to a center position of the interval between the first waveguide and the second waveguide so that the intensity of the light emitted from the light emitting ends 512 and 522 in the direction of the ABS of the first waveguide 51 and the second waveguide 52 (line $G_0$ of FIG. 6 (first alignment)). Next, the light source 40 is moved by sliding from the center position of the interval between the first waveguide 51 and the second waveguide 52 (line $G_0$ in FIG. 6) towards the track width direction (−Y direction) to the center position (line $G_1$ in FIG. 6) of the main waveguide 35 for assistance that is formed at a preset separating distance S, and then an operation is performed to align the light source 40 and the main waveguide 35 for assistance (second alignment).

Using this operation, the initial first alignment can make a precise alignment with higher precision than alignment using a single waveguide as with the conventional technology, and therefore the second alignment can be achieved while maintaining this precision and as a result alignment of the light source 40 and the main waveguide 35 for assistance can be performed with very high precision. Furthermore, as illustrated in FIG. 2, the back surface 2201 of the slider 22 and the joining surface 2300 of the light source unit 23 are joined for example using an adhesive layer of a UV hardening adhesive or the like.

Note, with regards to the alignment of the light source 40 and the main waveguide 35 for assistance in the Z direction, the beam expansion angle is increased in the Z direction (the same direction as the lamination direction of the LD) by the properties of the laser diode that is used (particularly a multilayer type end surface light emitting LD), and therefore a coupling efficiency distribution is achieved, and therefore there is no need to focus on the alignment in the Z direction.

The above-described optical waveguide of the present invention is explained in further detail based on a specific example.

Experimental Example I

The first waveguide 51 and the second waveguide 52 of the dummy waveguide component part 50 and the main waveguide 35 for assistance were formed as illustrated in FIG. 6.

The three waveguides, namely the first waveguide 51, the second waveguide 52, and the main waveguide 35 for assistance had the same waveguide shape and the same dimensions.

Furthermore, when determining the distance D2 between the light source 40 and the waveguides, the experimental example that was analyzed using a simulation of the relationship between the coupling efficiency and the distance D2 was performed using the following procedures.

<Simulation Conditions>
Core material: TaOx (refractive index: 2.08)
Core dimensions:
Wide width core base 511, 521 and 351 (width W1=4 µm; length L1=80 µm)
Tapered part (length L2=100 µm)
Narrow width leading edge core part (Width W2=0.5 µm; length L3=50 µm)
Thickness of waveguide (Z direction)=0.4 µm
(Note, a spot size converter with a thickness of 0.8 µm was added in a multilayered condition to the wide width core base and the tapered part.)
Cladding material: $Al_2O_3$ (refractive index: 1.67)
Laser light used: wavelength 810 nm, far field pattern (FFP) $\theta_y$=10.0 deg.
$\theta_z$=34.4 deg.

The results for the distance D2 between the light source 40 and the waveguides as well as the results for the coupling efficiency, which were analyzed by simulation are illustrated in the following Table 1. Note, considering the test conditions and the safety margin, a condition of offset of 400 nm from the center position in the waveguide width direction (Y direction) was assumed.

TABLE 1

| Distance D2 between the light source 40 and the waveguide (µm) | Coupling Efficiency (%) |
|---|---|
| 0.1 | 0.734 |
| 1 | 0.718 |
| 2 | 0.68 |
| 3 | 0.58 |
| 4 | 0.44 |
| 5 | 0.33 |
| 6 | 0.26 |
| 7 | 0.21 |
| 8 | 0.2 |

It was determined that D2 must be within 6 µm in order to achieve light coupling efficiency of 25% or higher.

Experimental Example II

The following simulation analysis was performed on the experimental example for one waveguide (refer to FIG. 6) with the same waveguide configuration as the first experimental example. In other words, the relationship between the optical power efficiency (%) and the offset (units: µm) of the light source 40 from the center position in the waveguide width direction (Y direction) was determined.

Figure 11:
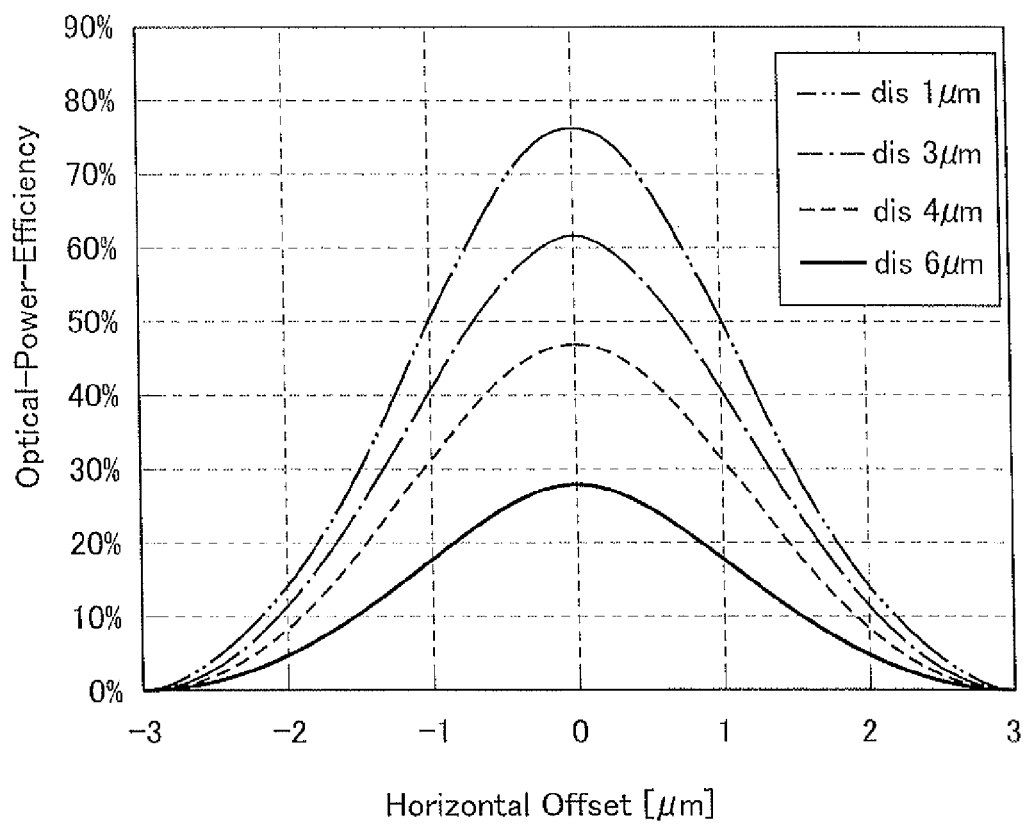
FIG. 11 is a graph illustrating the relationship between optical power efficiency (%) and offset (units: µm) of the light source from the center position in the waveguide width direction (Y direction).

The results are illustrated in the graph of FIG. 11. Note, the values for d is 1 µm, d is 3 µm, d is 4 µm, and d is 6 µm, indicated as parameters, correspond to the distance D1 (μm) between the light source 40 and the waveguide.

From the results illustrated in the graph of FIG. 11, when the absolute value of the offset (units: μm) is 3 μm or higher, the optical power efficiency will be approximately zero and the light intensity from the light emitting end of the waveguide cannot be measured. The width W1 of the wide width core base was 4 μm, so the case where the light source is that is positioned 1 μm away from the side surface of the core base width (corresponding to an offset position of 3 μm from the center position of the core substrate width W1) will be a limit value. When expressed as an interval distance D1 between the first waveguide 51 and the second waveguide 52, D1=2 μm was a limit value. Therefore, D1 must be smaller than 2 μm. In other words, as described above, a favorable range is 0.4 μm<D1<2 μm.

Note, the optical power efficiency is defined as (propagative efficiency×coupling efficiency).

The effect of the present invention is apparent from the aforementioned results. In other words, the thermally assisted magnetic recording head of the present invention has a magnetic recording element part that generates a magnetic field for writing, a main waveguide for thermally assisted recording that receives light from the back end surface located on the side opposite to the ABS and guides the light toward the ABS, and a dummy waveguide component part for performing alignment of the light source and the waveguide provided in parallel to the main waveguide for thermally assisted recording; the dummy waveguide component part has a pair of waveguides with the same shape and dimensions, namely the first waveguide that receives light from the back end surface positioned on the side opposite to the ABS and guides the light toward the ABS direction and the second waveguide; a shielding material is not provided on the light emitting ends in the ABS of the first waveguide and the second waveguide and thus the configuration is in a free condition that allows for measurement of the light intensity from the light emitting end; and the main waveguide for thermally assisted recording is formed at a preset distance from a center position of the interval between the first waveguide and the second waveguide, and the alignment between the light source and the main waveguide for thermally assisted recording can be performed by moving the light source to the position of the main waveguide for thermally assisted recording that is placed at a fixed distance, and therefore the alignment of the main waveguide can easily be performed with higher precision.

What is claimed is:

1. A thermally assisted magnetic recording head, comprising:
    a slider with an air bearing surface; and
    a light source unit comprising a light source formed on a light source supporting substrate; wherein
    the slider includes a slider substrate and a magnetic head part formed on a side surface position of the air bearing surface of the slider substrate;
    the magnetic head part includes a magnetic recording element part that generates a magnetic field for writing, a main waveguide for assistance for receiving light from a back end surface located on a side opposite to the air bearing surface and guiding the light in the direction of the air bearing surface, and a dummy waveguide component part provided in parallel to the main waveguide for assistance in order to align the light source and the waveguide; and
    the dummy waveguide component part includes a pair of waveguides having the same shape and dimensions including a first waveguide and a second waveguide that receive light from the back end surface positioned on the side opposite to the air bearing surface and guides the light toward the direction of the air bearing surface, wherein light emitting ends of the first waveguide and the second waveguide facing towards the air bearing surface have no shielding material, and are in a free condition so that the light intensity from the light emitting ends can be measured, the light generated by the light source of the light source unit is introduced respectively from back end part sides of the first waveguide and the second waveguide, and the light source can be temporarily aligned to a center position of an interval between the first waveguide and the second waveguide so that the intensity of the light emitted from the light emitting ends of the first waveguide and the second waveguide in the direction of the air bearing surface becomes the same.

2. The thermally assisted magnetic recording head according to claim 1, wherein
    the main waveguide for assistance is formed at a preset distance from the center position of the interval between the first waveguide and the second waveguide, and the light source is moved to the position of the main waveguide for assistance that is placed at a fixed distance so that the light source and the main waveguide for assistance can be aligned.

3. The thermally assisted magnetic recording head according to claim 1, wherein
    the interval distance D1 between the first waveguide and the second waveguide which are component members of the dummy waveguide component part is from 0.4 to 2.0 μm.

4. The thermally assisted magnetic recording head according to claim 1, wherein
    the width W1 of the back end surface that receives the light of the first waveguide and the second waveguide that are component members of the dummy waveguide component part is from 0.4 to 6.0 μm, and
    the width W2 of the light emitting end in the opposite direction is from 0.3 to 1.5 μm.

5. The thermally assisted magnetic recording head according to claim 1, wherein
    the distance D2 from the back end surface that receives the light of the first waveguide and the second waveguide that are component members of the dummy waveguide component part is from 0.1 to 4.0 μm.

6. A head gimbal assembly, comprising:
    the thermally assisted magnetic recording head according to claim 1, and
    a suspension that elastically supports the slider.

7. A hard disk device, comprising:
    the thermally assisted magnetic recording head according to claim 1, and
    an alignment device that supports the slider and aligns with regards to the recording medium.

8. A method of aligning the light source and the main waveguide for assistance in the thermally assisted magnetic recording head according to claim 1, the method comprising:
    introducing the light generated by the light source of the light source unit respectively from the back end part sides of the first waveguide and the second waveguide that are formed in the dummy waveguide component part, and temporarily aligning the light source to a center position of the interval between the first waveguide and the second waveguide so that the intensity of the light emitted from the light emitting ends in the direction of the air bearing surface of the first waveguide and the second waveguide become the same, and then moving the light source by sliding from the center position of the interval between the first waveguide and the second waveguide towards the track width direction to the center position of the main waveguide for assistance that is formed at a preset separating distance S, and then aligning the light source and the main waveguide for assistance.

* * * * *